No. 642,812. Patented Feb. 6, 1900.
R. COWEN.
YIELDING VEHICLE TIRE.
(Application filed Feb. 4, 1899.)
(No Model.) 2 Sheets—Sheet 2.
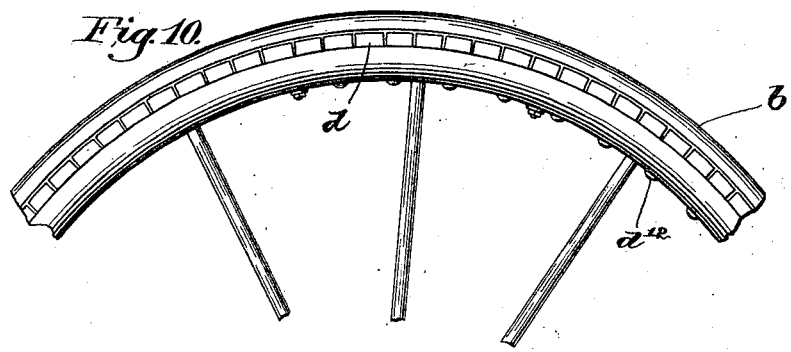
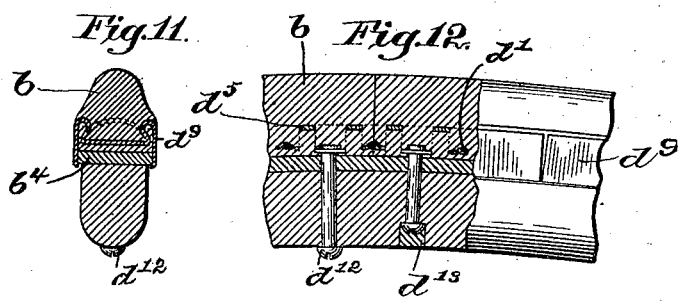
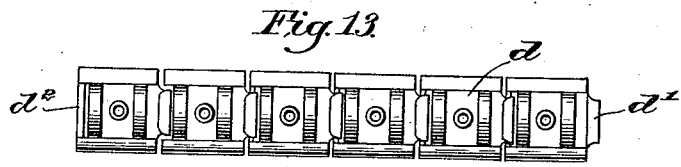
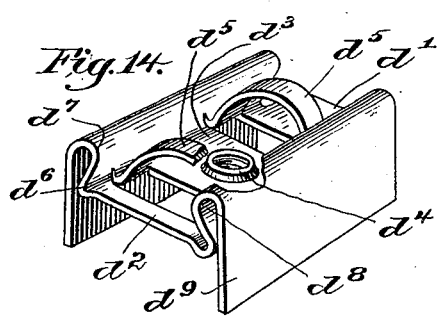
Witnesses:
Thomas J. Drummond
James M. Urquhart
Inventor:
Robert Cowen.
by Crosby & Gregory
Attys.

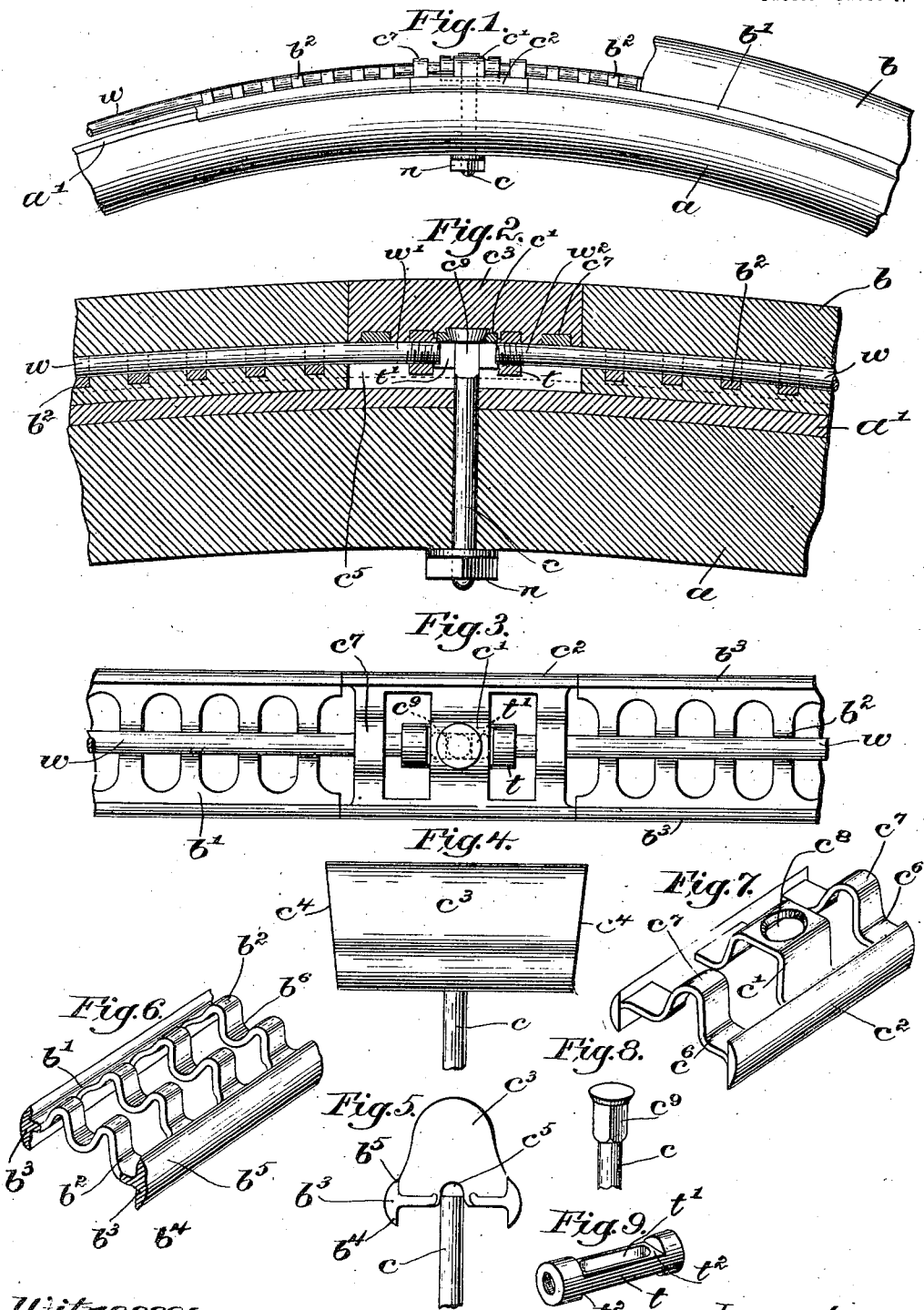
No. 642,812. Patented Feb. 6, 1900.
R. COWEN.
YIELDING VEHICLE TIRE.
(Application filed Feb. 4, 1899.)
(No Model.) 2 Sheets—Sheet 1.
Witnesses
Thomas K. Drummond
James M. Urquhart
Inventor
Robert Cowen
by Crosby & Gregory
attys.

UNITED STATES PATENT OFFICE.

ROBERT COWEN, OF CAMBRIDGE, MASSACHUSETTS.

YIELDING VEHICLE-TIRE.

SPECIFICATION forming part of Letters Patent No. 642,812, dated February 6, 1900.

Application filed February 4, 1899. Serial No. 704,477. (No model.)

*To all whom it may concern:*

Be it known that I, ROBERT COWEN, of Cambridge, county of Middlesex, State of Massachusetts, have invented an Improvement in Yielding Vehicle-Tires, of which the following description, in connection with the accompanying drawings, is a specification, like letters on the drawings representing like parts.

This invention is an improved yielding tire, preferably made of rubber, and particularly adapted for carriages, wagons, and similar road-vehicles, and has for its object the provision of a simple and relatively-inexpensive tire which may be readily and quickly put in place and secured properly by an ordinary wheelwright. Heretofore there have been various devices of this general nature; but they have been more or less complicated, and the only commercially practical ones that are on the market, so far as I am aware, have not been such that the ordinary wheelwright could secure them in place without special tools, the result being that this kind of tire has not received the general use which its desirability warrants.

My invention has for one of its leading features of novelty the provision of a removable section at the place where the meeting ends of the tire are secured, this removable section affording a sufficient space to enable the ordinary wheelwright to tighten and secure the tire proper with the usual tools at hand, and a further leading novelty of my invention resides in providing the yielding tread member of the tire with a carrier extending throughout its length and provided with retaining portions permanently embedded in the tread member, so that the tire may be placed on a felly and secured thereto simply by fastening the carrier.

Other features of invention and the constructional details of my invention will be pointed out more fully hereinafter, reference being had to the accompanying drawings, illustrative of preferred embodiments of my invention, and the latter will be more particularly defined in the appended claims.

In the drawings, Figure 1 is a side elevation, partly broken away, showing my improved tire secured on a usual wheel. Fig. 2 is an enlarged vertical longitudinal section thereof. Fig. 3 is a top plan view thereof, the yielding or rubber portion of the tire being omitted. Figs. 4 and 5 show the movable section in side and end elevations, respectively. Fig. 6 is a perspective view of a fragment of the carrier or supporting-plate of the tire. Fig. 7 is a perspective view of the carrier provided for the removable section. Figs. 8 and 9 are perspective views of securing devices. Fig. 10 is a broken side elevation of a modified construction. Fig. 11 is a transverse section thereof. Fig. 12 is an enlarged side elevation, partly in section. Fig. 13 is a top plan view of the carrier shown in Figs. 10 to 12. Fig. 14 is an enlarged perspective view, parts being broken away, showing one of the links of the carrier last mentioned.

For clearness of illustration I have shown my improved tire as mounted on an ordinary wheel having a felly or rim $a$ and a usual steel tire $a'$, although it will be understood that my tire will be provided as an article of manufacture to be secured wherever desired.

As is well known, the better road-vehicles are commonly provided with rubber tires, which conduce to the life of the vehicles and the comfort and convenience of their occupants, and these tires have as a general rule been secured to the vehicle-wheels by means of wires engaging the rubber of the tire in various ways and drawn tight, with their meeting ends electrically welded together, such arrangement, however, not only requiring special skill and experience, but being at best expensive and incapable of being carried out excepting at plants especially fitted therefor. With a view to cheapening this desirable kind of tire and making it feasible for the wheelwrights of the country generally to keep such tires in stock for easily placing them on any vehicle at a moment's notice when required I have mounted the yielding portion $b$, of rubber or any suitable equivalent, on a carrier $b'$, one form of which is shown in detail in Figs. 3 and 6. This carrier preferably extends in one piece throughout the peripheral length of the tire, although I do not limit myself in this respect when considering my invention broadly, inasmuch as other forms may be used with certain features of my invention. Retaining portions $b^2$ (herein shown in the form of arches or loops) project into the rubber at intervals throughout the length of the carrier for the purpose of permanently retaining the rubber immovably in place, these retaining members $b^2$ interlocking with the rubber sufficiently to insure holding the latter solidly and rigidly in proper position. As herein shown, the retaining portions extend at regular intervals in a continuous series around the tire between the side members $b^3$ of the carrier. These side members perform a twofold office, projecting inwardly at $b^4$, as is clearly shown in Fig. 5, for the purpose of embracing the rim of the wheel more or less, so as to retain the tire against lateral or shifting movement, and projecting outwardly at $b^5$ for not only inclosing the rubber of the tire, but also serving as wearing plates or flanges to receive the more severe blows, such as would be occasioned, for instance, by driving against a curbstone.

The retaining portions $b^2$ are properly shaped to receive one or more holding-wires, one wire being herein shown, (and which, together with the carrier, constitute the securing device by which I secure the tire on a wheel,) and the retaining portions $b^2$ accordingly have a central depression $b^6$ extending throughout the length of the carrier, in which a holding-wire $w$ is laid prior to molding the rubber and carrier together, so that the holding-wire is ultimately permanently held within the body of the tire.

Wires have been heretofore embedded in a solid rubber tire as a means for securing it; but, so far as I am aware, these wires have usually been held in such a manner that they were liable to cut the tire and had to terminate flush with the ends of the tire in order that said ends might be brought snugly together for electrically welding or other union. I depart radically, however, from this old construction and leave the ends of the wire projecting from the ends of the yielding part $b$ of the tire, said projecting ends being shown at $w'$ and $w^2$, Fig. 2, where I fasten them together by any suitable means. I prefer to join the ends of the tire by means of a turnbuckle, the ends $w'$ $w^2$ of the wire being herein shown as threaded for that purpose and secured by means of a turnbuckle $t$. This turnbuckle is centrally slotted at $t'$ and preferably cut away at $t^2$, as shown best in Fig. 9, to accommodate it to the bolt or fastener $c$ and bridge $c'$ of the carrier-plate $c^2$ and embedded within and forming a part of a removable section $c^3$, which constitutes an important feature of my present invention. This removable section $c^3$ preferably has upwardly-divergent ends, as represented at $c^4$, Fig. 4, in order that when it is forced into place the peripheral surface will be brought under desirable compression, as is evident viewing Fig. 2, and it has on its under side a recess $c^5$ to fit down snugly over the projecting ends of the holding-wire, the retaining portions $c^6$ of the plate $c^2$, which correspond to the retaining portions $d^2$ of the larger carrier proper, being correspondingly shaped by having a central loop $c^7$. (Shown in perspective in Fig. 7 and in section in Figs. 1 and 2.) The bridge $c'$ of the small carrier $c^2$ is centrally perforated at $c^8$ and flattened at its top in order to properly receive the retaining-bolt $c$, as herein shown, although it will be understood that various other securing means may be substituted instead of this particular construction, and yet be within my invention. The bolt $c$ has a flattened upper end $c^9$, corresponding in width substantially to the slot $t'$, so that when the removable section is placed over the wire ends $w'$ $w^2$ after the latter have been drawn tight by the turnbuckle $t$ the bolt $c$ fits down snugly through the turnbuckle and prevents any possible turning of the latter, while likewise the turnbuckle prevents rotation of the bolt.

Preferably the shoulders or cut-away part $t^2$ of the turnbuckle is wider or longer than the width of the bridge $c'$, so that in case the ends $w'$ $w^2$ of the wire should not project to exactly the same extent the turnbuckle can occupy a position correspondingly nearer to one or the other end of the tire-body $b$.

Having provided a construction substantially as above described, it will be evident that its application to a wheel is exceedingly simple and may be accomplished most expeditiously. All that is necessary is simply to apply the tire to the wheel, flexing it more or less, as conditions may require, in order to fit it flat against the tire or rim of the wheel and join the ends of the holding-wire by means of the turnbuckle $t$, turning the latter until the holding-wire is entirely taut. Then simply insert the bolt $c$ through the slot $t'$ and apply a fastening-nut or other securing means $n$ to the bolt until the piece $c^3$ is drawn in snugly and solidly flush with the rest of the tire. The result is that the tire is secured with absolute permanency and rigidity against all possible shifting in any direction on the wheel, the holding-wire $w$ of the securing device bearing directly on each of the retaining portions and through the latter gripping the body of the tire at every point throughout its length, (although it will be understood that, if desired, certain of these portions of the carrier may be omitted,) and the said members of the carrier gripping both the wheel and the rubber, so as to cause the parts mutually to support each other, while itself acting at the same time as a fender and strengthening-rib for the yielding part of the tire.

I prefer to make the carrier of rolled metal, although it may be otherwise formed if preferred.

While I have herein shown the best mode in which I have contemplated applying my invention, I wish it understood that I am not limited thereto, inasmuch as there are various other constructions within the spirit and scope of my invention, broadly considered, one construction being shown in my Patent No. 611,375 and another construction being shown in my application Serial No. 648,383, and I desire to explain at this point that in certain respects, the broad feature of my invention residing in providing a yielding tread member with a flexible securing device, including a carrier having retaining-arches extending into and permanently embedded in the tread member, my present application is a continuation of the application last mentioned above.

I have used the words "retaining portions" in this specification, and I wish it understood that by this term and by the term "retaining-arches" I mean simply any projecting member which is so shaped and constructed that it passes into the mass or body of the yielding tread member and becomes embedded and interlocked permanently in the body portion of said tread member—that is to say, I have, for example, shown a ribbon-like M-shaped part $b^6$ in Fig. 6, which extends up into the rubber, as shown in Fig. 2, and gets a holding grip directly in the rubber, which retains the yielding part of the tire tenaciously in place, and while this particular form of arch or retaining portion is preferable I do not intend to limit myself in this respect, but intend to claim all variations thereof which accomplish substantially the same general purpose.

In Figs. 10 to 14 I have shown a modified form of my invention, in which the carrier instead of being made in one piece, as in the preceding figures, is made up of a plurality of links $d$, which may be coupled together to any extent by suitable means, projecting tongues $d'$ being herein shown as hooked over bars $d^2$ in order to cause the desired amount of rigidity to the carrier and yet permit a reasonable amount of flexure therein in order to accommodate the tire, for instance, to large and small wheels.

Referring to Fig. 14, it will be seen that in this form of carrier each link is struck from a piece of sheet metal, preferably steel, having the bar $d^2$ and tongue $d'$ at the opposite ends thereof, and midway of these provided with a bridge $d^3$, having a threaded boss $d^4$ at its center, and adjacent either side of the bridge is a retaining-arch $d^5$, the sides of the link being formed by crimping the plate upwardly at $d^6$ and inwardly at $d^7$ to form a sort of dovetail portion for the upper side of the link, in which the rubber is secured, Fig. 2, the link being bent over to form a loop $d^8$ and downwardly at $d^9$ for the purpose of embracing the sides of the wheel-rim, as previously explained in connection with the flanges $b^4$. The carrier having received its yielding tread member, as already explained, screws $d^{12}$ are then inserted through the felly into such of the links as it is found necessary, these screws being countersunk, if desired, and the holes filled in with plugs $d^{13}$. (See Fig. 12.) The rubber is so embedded and interlocked with its carrier that it is practically as strong as though it were one piece.

While I have herein described in detail the various structural features of my improved tire, I wish it understood that I am not restricted thereto, inasmuch as many alterations and substitutions may be resorted to within the spirit and scope of my invention.

Having described my invention, what I claim as new, and desire to secure by Letters Patent, is—

1. A tire, consisting of a yielding tread member, and a flexible securing device including a carrier having retaining-arches extending into and permanently embedded in the tread member, substantially as described.

2. A tire, consisting of a yielding tread member, and a securing device therefor, said securing device comprising a carrier and a wire extending longitudinally of the tire, said carrier having a plurality of retaining portions at intervals permanently embedded in the tread member, and depressions in which said wire rests, and means for securing the ends of the wire together for holding the tire in place, substantially as described.

3. A tire, consisting of a yielding tread member, and a securing device therefor, said device comprising a plurality of metal retaining portions projecting into and permanently embedded in the tread member, said retaining portions having depressions, and a holding-wire extending longitudinally of the tire and carried by said depressions, substantially as described.

4. A tire, consisting of a yielding tread member, and a carrier therefor, said carrier comprising side members, each having an inwardly-extending flange to embrace the rim of the wheel, and an outwardly-extending flange embracing the tread member, and retaining portions permanently embedded in the tread member, substantially as described.

5. A tire, consisting of a yielding tread member, and a carrier therefor, said carrier comprising side members, each having an inwardly-extending flange to embrace the rim of the wheel, and an outwardly-extending flange embracing the tread member, and retaining portions permanently embedded in the tread member, said carrier extending in one piece throughout the greater portion of the tire, substantially as described.

6. A tire, consisting of a yielding tread member, and a securing device therefor, comprising a carrier having a plurality of retaining portions embedded in the body of the tread member and having intermediate depressions, and a holding-wire resting in said depressions longitudinally of the tire, said holding-wire projecting at its ends beyond the ends of the tread member, substantially as described.

7. A tire, comprising a yielding tread member, a holding-wire for securing the same, said wire extending longitudinally thereof, and projecting at its ends beyond the ends of the tread member, means for securing said ends of the wire, and a removable section for inclosing and concealing said secured ends, said section comprising a yielding tread portion, and clamping means for clamping the same in place, substantially as described.

8. In a yielding vehicle-tire, the herein-described means for securing adjacent portions of the tire together, comprising holding devices carried by and projecting from said adjacent portions of tire and joining the same together in desired adjustment, and a removable section adapted to fit between said adjacent portions of tire and inclosing said holding devices, said section comprising a yielding tread portion, and means for securing it, substantially as described.

9. In a yielding vehicle-tire, the herein-described means for securing adjacent portions of the tire together, comprising holding devices carried by and projecting from said adjacent portions of tire and joining the same together in desired adjustment, and a removable section adapted to fit between said adjacent portions of tire and inclosing said holding devices, said section comprising a yielding tread portion, and having its ends flaring divergently downward, and means for securing it, substantially as described.

10. In a yielding vehicle-tire, the herein-described means for securing adjacent portions of the tire together, comprising holding devices carried by and projecting from said adjacent portions of tire and joining the same together in desired adjustment, and a removable section adapted to fit between said adjacent portions of tire and inclosing said holding devices, said section comprising a yielding tread portion, a carrier-plate permanently embedded in said tread portion, and a securing-bolt carried by said plate, substantially as described.

11. In a yielding vehicle-tire, the herein-described means for securing adjacent portions of the tire together, comprising threaded ends projecting from said adjacent portions of tire, a turnbuckle for joining said threaded ends, and a removable section for occupying the space between said ends of tire and inclosing said turnbuckle and threaded ends, said section comprising a flexible tread portion, and a carrier-plate embedded therein, said turnbuckle having an intermediate slot, and a bolt engaging said removable section and passing through said slot for locking the parts in position, substantially as described.

12. The combination with a tire carrying threaded wire ends, of a turnbuckle for engaging said threaded ends and tightening the wire, a removable section for inclosing said turnbuckle and wire ends, a carrier-plate permanently embedded in said removable section, and means engaging said carrier-plate for securing said section to a wheel-rim, said engaging means interlocking with said turnbuckle to prevent the latter from turning when said section is in place, substantially as described.

In testimony whereof I have signed my name to this specification in the presence of two subscribing witnesses.

ROBERT COWEN.

Witnesses:
  GEO. H. MAXWELL,
  FREDERICK L. EMERY.